United States Patent [19]

Streit et al.

[11] 4,128,511

[45] Dec. 5, 1978

[54] WATER-SOLUBLE, CROSSLINKED NITROGENOUS CONDENSATION PRODUCTS PRODUCED BY REACTION OF CHLOROHYDRIN-ETHERS WITH ETHYLENEIMINE

[75] Inventors: Werner Streit, Bobenheim; Rolf Fikentscher; Karl Gans, both of Ludwigshafen; Gerhard Welzel, Mannheim, all of Fed. Rep. of Germany

[73] Assignee: BASF Aktiengesellschaft, Ludwigshafen a. Rhein, Fed. Rep. of Germany

[21] Appl. No.: 821,549

[22] Filed: Aug. 3, 1977

[30] Foreign Application Priority Data

Aug. 28, 1976 [DE] Fed. Rep. of Germany ....... 2638955

[51] Int. Cl.$^2$ .............................................. C08L 63/00
[52] U.S. Cl. ..................................... 528/424; 528/404
[58] Field of Search ..................................... 260/2 EN

[56] References Cited

U.S. PATENT DOCUMENTS

| 3,658,641 | 4/1972 | Shen | 260/2 EN |
| 3,890,172 | 6/1975 | Filter et al. | 260/2 EN |

*Primary Examiner*—M. J. Welsh
*Attorney, Agent, or Firm*—Keil, Thompson & Shurtleff

[57] ABSTRACT

Water-soluble, crosslinked nitrogen-containing condensation products, the viscosity of which, in aqueous solution, increases with increasing temperature, are obtained by reacting a chlorohydrin-ether of the formula

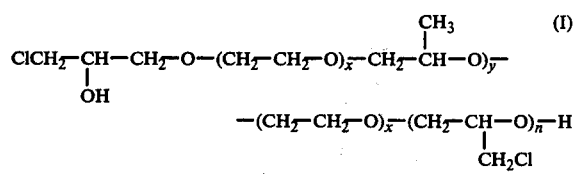

where x is from 50 to 250, y is from 20 to 100, the ratio x:y is from 6.1:1 to 1:15 and n is from 0.5 to 5, with ethyleneimine in the weight ratio of from 1:10.1 to 1:0.8; the condensation products are added to aqueous systems, e.g. polymer solutions and polymer dispersions, to improve the viscosity characteristics.

3 Claims, No Drawings

WATER-SOLUBLE, CROSSLINKED NITROGENOUS CONDENSATION PRODUCTS PRODUCED BY REACTION OF CHLOROHYDRIN-ETHERS WITH ETHYLENEIMINE

The present invention relates to water-soluble, cross-linked nitrogen-containing condensation products, the viscosity of which, in aqueous solution, increases with increasing temperature.

U.S. Pat. No. 3,347,803 discloses incompletely condensed resins which can be cured in an alkaline medium and which are manufactured by reacting polyether-chlorohydrins, the polyether chain of which contains from 3 to 70 alkylene oxide units, with polyamines or ammonia in certain molar ratios. The products are used as curable coatings for metal and glass, and as textile finishes.

It is an object of the present invention to provide water-soluble resins, the viscosity of which, in aqueous solution, varies in the same sense as the temperature, or is virtually temperature independent.

We have found that this object is achieved by water-soluble, crosslinked nitrogen-containing condensation products, the viscosity of which, in aqueous solution, increases reversibly with increasing temperature, and which are obtained by reacting a chlorohydrin-ether of the formula (I)

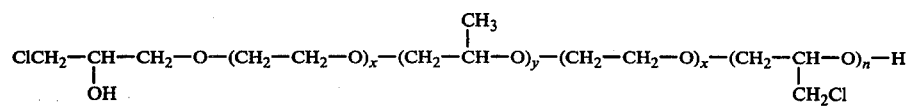

where x is from 50 to 250, y is from 20 to 100, the ratio x:y is from 6.5:1 to 1:15 and n is from 0.5 to 5, with ethyleneimine in the weight ratio of from 1:0.1 to 1:0.8.

Chlorohydrin-ethers of the general formula I can be manufactured by, for example, first forming an adduct of ethylene oxide with a polypropylene glycol containing from 20 to 100 propylene oxide units, under conditions such that the molar ratio of ethylene oxide units to propylene oxide units in the resulting block copolymer is from 6.5:1 to 1:15 and the degree of ethoxylation per hydroxyl group in the polypropylene glycol is from 50 to 250, preferably from 75 to 150. The block copolymer is then reacted with epichlorohydrin in the molar ratio of from 1:1.5 to 1:6.

To manufacture the water-soluble, crosslinked condensation products of the invention, the chlorohydrin-ethers of the formula I are reacted with ethyleneimine. The crosslinking of the chlorohydrin-ethers of the formula I with ethyleneimine may be carried out in aqueous solution, in alcoholic solution, e.g. in an alcohol of 1 to 6 carbon atoms, in emulsion, or by the inverse dispersion process. If the condensation is carried out in emulsion or in an inverse dispersion, the products of the invention are obtained in the form of granules, whilst in the other processes they are obtained as aqueous or alcoholic solutions. The crosslinking reaction takes place most rapidly in aqueous solution, but this frequently only gives very dilute solutions since the crosslinked condensates very greatly increase the viscosity. It is difficult to isolate the crosslinked products from the solutions. The crosslinking reaction may be carried out over a wide range of temperatures, e.g. at from 60° to 140° C., preferably from 80° to 90° C.

The chlorohydrin-ethers of the formula I can also be crosslinked with mixtures of ethyleneimine and amines, provided the mixtures contain not less than 50% by weight of ethyleneimine. Examples of suitable amines are alkylamines, e.g. methylamine, ethylamine and butylamine, hydroxyalkylamines, e.g. β-hydroxyethylamine or polyalkylene-polyamines of the formula

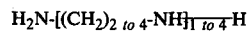

Products according to the invention, having a particularly high viscosity, can be obtained by additionally crosslinking the reaction products of compounds of the formula I and ethyleneimine with chlorohydrin-ethers having a molecular weight of from 400 to 2,900 at from 60° to 90° C. The crosslinking reaction may be carried out in solution, emulsion or inverse dispersion. The chlorohydrin-ethers which may be used for this subsequent crosslinking have a substantially lower molecular weight than the chlorohydrin-ethers of the formula I. The chlorohydrin-ethers acting as crosslinking agents, and having molecular weights of from 400 to 2,900, are manufactured, for example, by reacting polyglycols, e.g. polyethylene glycol, polypropylene glycol or block copolymers of ethylene oxide and propylene oxide with epichlorohydrin in a molar ratio of from 1:1 to 1:5. Such crosslinking agents are also described, for example, in U.S. Pat. No. 3,347,803 which is hereby incorporated by reference.

Surprisingly, the viscosity of dilute aqueous solutions of the products of the invention increases with increasing temperature or remains approximately constant on increasing the temperature of the aqueous solution and decreases on decreasing the temperature of the solution. The products of the invention are employed as thickeners for aqueous systems, e.g. in the print pastes, paper coating compositions and emulsion paints or, quite generally, as anti-migration agents for aqueous solutions and polymer dispersions, the amounts employed being from 0.1 to 5% by weight, based on the aqueous solution or dispersion. Larger amounts, e.g. from 20 to 40% by weight, of the condensation products of the invention may also be used. The products of the invention may be used in conjunction with any aqueous polymer dispersions: for example, when used in connection with the impregnation of non-woven fibrous products with dispersions, they ensure a particularly uniform distribution of the dispersion. In the coating of absorbent substrates, a mixture of an aqueous polymer solution or dispersion and the antimigration agent of the invention penetrates less deeply into the substrate. When the products of the invention are used in the paints sector, uniform application of the polymer is achieved with aqueous systems, and the coating can be dried at an elevated temperature without causing local changes in the thickness of the layer applied.

The products of the invention are additionally used, in the form of an aqueous solution of from 0.1 to 5% strength by weight, as quenching baths for tempering steels. For example, in the Jominy end-face quenching test, quenching characteristics and temper curves resembling those achieved with tempering oils are obtained, i.e., the steel is tempered more gently than is feasible with pure water. Compared to the oils conventionally used for tempering steel, the aqueous solution of the products according to the invention offers substantial advantages; in particular, the aqueous solution is odorless and non-flammable, and rinsing-off the tempered workpiece is not necessary.

The Examples which follow illustrate the invention; parts and percentages are by weight.

EXAMPLE 1

A chlorohydrin-ether of the general formula I, where x is 75, y is 30, the ratio x:y is 2.5:1 and n is 2, is prepared by adding 9 g of epichlorohydrin, followed by 5 g of boron trifluoride-etherate, to 2,500 g of a polyether-diol of the formula

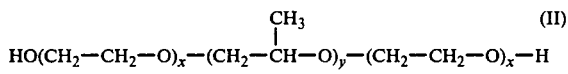

where x is 75 and y is 30, at 75° C. After about 15 minutes, 75 g of epichlorohydrin are added, as a single portion, to the batch. After a reaction time of 4 hours at 75° C., all the epoxide has been converted.

600 g of the resulting chlorohydrin-ether are then dissolved in 600 g of water. The solution is heated to from 70° to 90° C. and 360 g of a 50% strength aqueous ethyleneimine solution are added in the course of 90 minutes. The reaction mixture is kept at 80° C. for a further 4 hours and is then diluted with water to give a 20% strength aqueous solution. The viscosity of the aqueous solution at 20° C. is 130 mPas, whilst at 50° C. it is 2,400 mPas.

The water-soluble, crosslinked nitrogen-containing condensation product is used as an additive in water-based paints, in an amount of 2% based on the paint.

EXAMPLE 2

600 g of a 10% strength aqueous solution of the crosslinked, nitrogen-containing condensation product described in Example 1 are reacted at 70° C. with 180 g of a 10% strength aqueous solution of a chlorohydrin-ether of the general formula

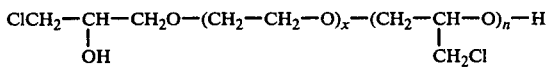

where x is 34 and n is 1.6. The reaction takes 5 hours. During the reaction, water is added so that a 4% strength aqueous solution of the reaction product is obtained. This solution has a viscosity of 200 mPas at 20° C.

The resulting product is used, as an 0.5% strength aqueous solution, as a quenching bath for tempering steels. When tempering a K8, 30 Cr Mo V9 steel, a tempering curve (Vickers hardness as a function of the quenched surface) is obtained which is similar to that obtained on tempering with quenching oil and is thus substantially below the curve for pure water.

EXAMPLE 3

14 g of epichlorohydrin and 10.4 g of boron trifluoride-etherate are added, at 65° C., to 4,164 g of a polyether-diol of the general formula II, where x is 113 and y is 44. After 15 minutes, 125 g of epichlorohydrin are added. The reaction mixture is heated for 4 hours at 75° C. A chlorohydrin-ether of the formula I, where x is 113, y is 44, n is 3.5 and the ratio x:y is 2.56:1 is obtained.

150 g of the chlorohydrin-ether are then dissolved in 150 g of water and 45 g of a 50% strength aqueous ethyleneimine solution are added at 80° C. The reaction is complete after eight hours. Since the viscosity of the reaction mixture rises during crosslinking, it is advisable to dilute the reaction mixture with water, during the reaction, to a solids content of 10%. The viscosity of the 10% strength solution is about 4,500 mPas at 50° C. and 1,200 mPas at 20° C.

If a glass fiber web is impregnated with a dye dispersion to which 0.2% of the crosslinking product has been added, the dye is absorbed uniformly and after drying the web exhibits a level shade. No dye agglomerates form even at the cross-over points of the glass fibers in the web.

EXAMPLE 4

200 g of the chlorohydrin-ether described in Example 1 and 100 g of a chlorohydrin-ether of the general formula I, where x is 13.5, y is 30, the ratio x:y is 1:2.2 and n is 1.2 are mixed and dissolved in 300 g of water. 180 g of a 50% strength aqueous ethyleneimine solution are then added at 80° C., and the reaction mixture is kept for 6 hours at from 80° to 90° C. and is then diluted with water so as to give a 10% strength aqueous solution of the cross-linked, nitrogen-containing condensation product. The viscosity of the 10% strength solution is 140 mPas at 20° C. and 1,200 mPas at 50° C.

The resulting aqueous solution of the nitrogen-containing condensation product is used in an amount of 3% as an antimigration agent for a styrene-butadiene-acrylic acid copolymer dispersion employed for impregnating webs.

EXAMPLE 5

1,200 ml of octane are mixed with 30 g of a commercial oxyalkylated alkylphenol (as an emulsifier) and 30 g of water. An aqueous solution of 225 g of the chlorohydrin-ether described in Example 1 is then added with vigorous stirring at from 80° to 95° C., followed by 22.5 g of ethyleneimine dissolved in 600 g of water. After a reaction time of 18 hours at 85° C., the water is separated off. The condensation product hereupon separates out as fine granules. The viscosity of a 10% strength aqueous solution is 50 mPas at 20° C. and 90,000 mPas at 80° C.

EXAMPLE 6

6 g of diethylenetriamine, 6 g of concentrated hydrochloric acid, 24 g of ethyleneimine and 150 g of the chlorohydrin-ether described in Example 3 are introduced into a flask. 800 ml of octane and 40 g of water are then added. The resulting coarse dispersion is stirred vigorously for 20 hours at 80° C. A nitrogen-containing water-soluble condensation product is obtained, which on cooling the dispersion separates out as coarse granules. The condensation product can be isolated easily. A 10% strength aqueous solution of the product has a viscosity of 500 mPas at 20° C. and of more than 100,000 mPas at 50° C.

The condensation product is used to prepare non-migrating solutions and polymer dispersions. If, for example, a web is impregnated with a butadiene-styrene copolymer dispersion of about 25% strength, the excess dispersion is squeezed off between two rollers and the web is dried at an elevated temperature, the polymer of the dispersion is found to have coalesced into large drops which have migrated to the surface of the web so that the polymer is non-uniformly distributed.

If, on the other hand, 0.5%, based on solids, of the nitrogen-containing condensation product described above is added, in aqueous solution, to the 25% strength butadiene-styrene polymer dispersion and the impregnation of the web is repeated, using the same procedure, the polymer of the dispersion is found to be uniformly distributed even after squeezing off and drying the web.

The polymer dispersion behaves similarly when sprayed onto a web. Only if the crosslinked, water-soluble nitrogen-containing condensation product has been added to the polymer dispersion does the binder remain uniformly distributed on the web.

EXAMPLE 7

6 g of diethylenetriamine, 6 g of concentrated hydrochloric acid, 24 g of ethyleneimine and 150 g of the chlorohydrin-ether described in Example 3 are introduced into a flask. An emulsion of 40 g of water in 400 ml of octane, containing 20 g of an emulsifier (HLB value 4) is then added. After a reaction time of 18 hours at 85° C., fine, porous granules separate out on cooling the reaction mixture. The viscosity of a 10% strength aqueous solution is above 100,000 mPas at 50° C., whilst at 20° C. it is only 80 mPas. The cross-linked, water-soluble condensation product obtained is employed as a thickener in water-based paints.

We claim:

1. A water-soluble, crosslinked nitrogen-containing condensation product, the viscosity of which, in aqueous solution, increases with increasing temperature, obtained by reacting a chlorohydrin-ether of the formula

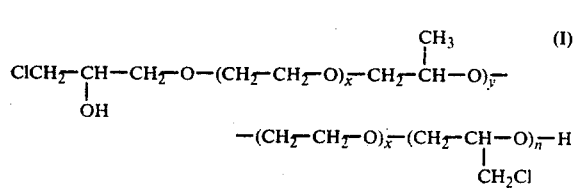

where x is from 50 to 250, y is from 20 to 100, the ratio x:y is from 6.1:1 to 1:15 and n is from 0.5 to 5, with ethyleneimine in the weight ratio of from 1:0.1 to 1:0.8.

2. A water-soluble, crosslinked nitrogen-containing condensation product as claimed in claim 1, which is manufactured in the presence of from 0.1 to 0.8 part by weight, per part by weight of the chlorohydrin-ether of the formula I, of a chlorohydrin-ether having a molecular weight of from 400 to 2,900.

3. A water-soluble, cross-linked condensation product as claimed in claim 1, in which up to 50% of the ethyleneimine is replaced by an amine.

* * * * *

UNITED STATES PATENT AND TRADEMARK OFFICE
CERTIFICATE OF CORRECTION

PATENT NO. : 4,128,511
DATED : Dec. 5, 1978
INVENTOR(S) : STREIT ET AL

It is certified that error appears in the above-identified patent and that said Letters Patent are hereby corrected as shown below:

In the Abstract, line 3 after the formula, delete "1:10.1" and substitute --1:0.1--.

In claim 1, cancel formula (I) and insert the following formula (I)

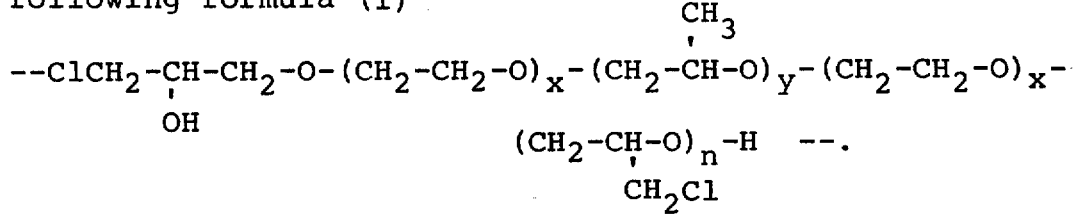

$$--ClCH_2-\underset{OH}{CH}-CH_2-O-(CH_2-CH_2-O)_x-(CH_2-\underset{CH_3}{CH}-O)_y-(CH_2-CH_2-O)_x-(CH_2-\underset{CH_2Cl}{CH}-O)_n-H \;--.$$

Signed and Sealed this

Eighth Day of May 1979

[SEAL]

Attest:

RUTH C. MASON
Attesting Officer

DONALD W. BANNER
Commissioner of Patents and Trademarks